United States Patent [19]

May

[11] 4,339,096

[45] Jul. 13, 1982

[54] CABLE LAYING APPARATUS

[76] Inventor: Amos May, P.O. Box 964, Alvin, Tex. 77511

[21] Appl. No.: 223,222

[22] Filed: Jan. 7, 1981

[51] Int. Cl.³ .......................................... B65H 75/40
[52] U.S. Cl. .................................................. 242/86.5 R
[58] Field of Search .............. 242/86.5 R, 86.52, 86.5, 242/54 R; 74/11; 173/46; 405/154, 164; 414/569, 621

[56] References Cited

U.S. PATENT DOCUMENTS

| | | | |
|---|---|---|---|
| 2,616,636 | 11/1952 | Aden | 242/86.5 R |
| 2,867,390 | 1/1959 | Anrig | 242/86.5 R |
| 2,914,270 | 11/1959 | Parker | 242/86.5 R |
| 4,049,140 | 9/1977 | Roose | 242/86.5 R |

Primary Examiner—Edward J. McCarthy
Attorney, Agent, or Firm—Neal J. Mosely

[57] ABSTRACT

A cable laying apparatus is provided for use with agricultural tractors equipped with a rear, three-point, hydraulically operated hitch. The apparatus comprises a supporting frame for lifting, carrying and unwinding heavy spools of wire, particularly barbed wire for laying fences and the like. The supporting frame is formed of a plurality of pieces of hollow, square steel tubing. A rear piece of tubing is to be supported cross-wise at the rear end of the tractor and has a pair of brackets thereon positioned to be supported on two of the supports of the three-point hitch. A pair of square tubular members are supported on the rear piece of tubing and extend rearwardly therefrom. A cross-piece of square tubing extends cross-wise of the rearwardly extending members through square holes therein. The cross-wise member has a pair of brackets supported thereon for connection to the third support of the three-point hitch. The rear ends of the rearwardly extending members are notched to receive and support the shaft or axle of a spool of wire and have latches for securing the same in place. The various pieces of tubular members are separable for disassembly and assembly and are provided with a pluraity of holes for connection together by pin connections in various selected configurations.

18 Claims, 6 Drawing Figures

CABLE LAYING APPARATUS

BACKGROUND OF THE INVENTION

1. Field of the Invention

This invention relates to new and useful improvements in cable and wire laying apparatus and more particularly to apparatus which can be removable installed on agricultural tractors.

2. Brief Description of the Prior Art

There have been numerous attempts made in the prior art to provide a satisfactory mobile support for handling spools of cable or wire for installation in the field. Most of the prior art attempts have involved apparatus requiring the use of specially designed tractors and apparatus which was expensive to manufacture and complex to build.

Aden U.S. Pat. No. 2,616,636 discloses a rolled wire attachment for vehicles. The attachment is of tubular steel and is not designed for use with a standard three-point hitch, although it is usable with hydraulic hoists which are available on some tractors. The structure is fixed in width and does not provide for adjustability in construction or for positioning of a roll of cable to either side of the vehicle for laying down fence wire.

Brown U.S. Pat. No. 3,356,341 discloses a winding and stretching attachment for wire fences. This is a complicated arrangement involving a separate drive mechanism extending to the spool-carrying framework.

Van Polen U.S. Pat. No. 3,880,305 discloses a bale handling apparatus having a vertical frame and a hydraulically actuated tilting frame for supporting a mechanism for picking up a round bale of hay.

Whistle U.S. Pat. No. 3,934,655 discloses a hydraulic post setting and wire dispensing apparatus which is quite complicated and includes a variety of wire spool supports.

Parker U.S. Pat. No. 3,946,887 discloses an apparatus for handling bales of hay. This apparatus is susceptible of being carried by a three-point hitch on an agricultural tractor but is lacking in adjustment as to size and configuration and is complicated by added hydraulic mechanism for tilting the supporting members outward.

Roose U.S. Pat. No. 4,049,140 discloses a hay baling device consisting U-shaped framework carried on a tractor and having a hydraulic mechanism for spreading and closing the side arms of the support.

SUMMARY OF THE INVENTION

One of the objects of this invention is to provide a new and improved cable laying apparatus.

Another object is to provide an improved cable laying apparatus that is simple and inexpensive to manufacture and easy to install.

Another object is to provide a new and improved cable laying apparatus which can be removably installed on a conventional agricultural tractor.

Still another object is to provide an improved cable laying apparatus that operates from a three-point hitch on an agricultural tractor.

Still another object is to provide an improved cable laying apparatus which may be supported on a tractor and which is adjustable in configuration and easily knocked down and assembled in the field.

Other objects of this invention will become apparent from time to time throughout the specification and claims as hereinafter related.

These and other objects of the invention are attained by the novel cable laying apparatus that comprises this invention. A cable laying apparatus is provided for use with agricultural tractors equipped with a rear, three-point, hydraulically operated hitch. The apparatus comprises a supporting frame for lifting, carrying and unwinding heavy spools of wire, particularly barbed wire for laying fences and the like. The supporting frame is formed of a plurality of pieces of hollow, square steel tubing. A rear piece of tubing is to be supported crosswise at the rear end of the tractor and has a pair of brackets thereon positioned to be supported on two of the supports of the three-point hitch. A pair of square tubular members are supported on the rear piece of tubing and extend rearwardly therefrom. A cross-piece of square tubing extends cross-wise of the rearwardly extending members through square holes therein. The cross-wise member has a pair of brackets supported thereon for connection to the third support of the three-point tractor hitch. The rear ends of the rearwardly extending members are notched to receive and support the shaft or axle of a spool of wire and have latches for securing the same in place. The various pieces of tubular members are separable for disassembly and assembly and are provided with a plurality of holes for connection together by pin connections in various selected configurations.

DESCRIPTION OF THE PREFERRED EMBODIMENT

Figure 1:
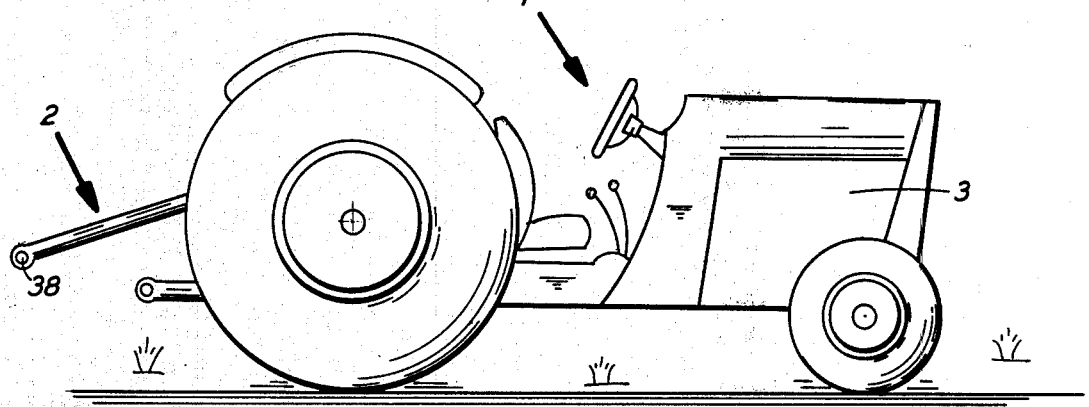
FIG. 1 is a view in side elevation of a conventional agricultural tractor having a three-point, hydraulically operated hitch.

Referring to the drawings, and particularly to FIG. 1, there is shown a conventional agricultural tractor 1 having a three-point hitch 2 operated by a hydraulic pump or motor (not shown) driven by the engine 3. The three-point hitch 2 is of conventional construction and is seen in more detail in FIGS. 5 and 6. The three-point hitch 2 consists of a pair of jointly movable laterally spaced lower arms 4 and 5 and a separately movable single upper arm 6. The arms 4, 5 and 6 of the three-point hitch 2 are operated by a hydraulic motor (not shown) driven by the tractor engine 3. The three-point hitch 2 is conventionally used with various types of agricultural equipment, such as a plow or disc or cultivator, and the arms 4, 5 and 6 can be pivoted upward by the hydraulic motor for lifting whatever equipment is carried by the hitch.

Figure 2:
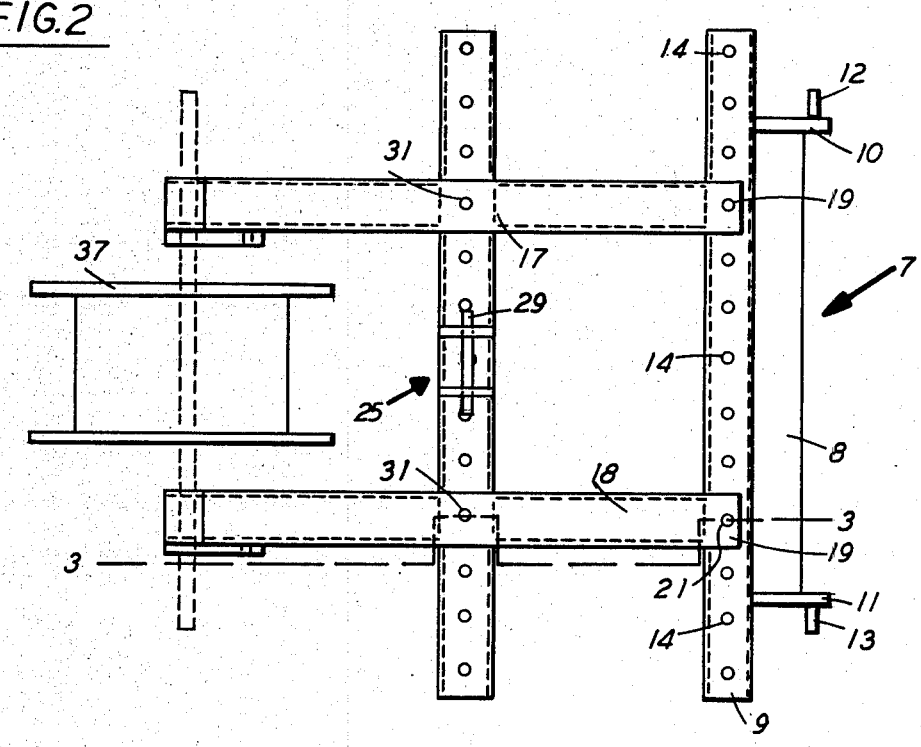
FIG. 2 is a top plan view of a cable laying apparatus usable with the tractor and hitch shown in FIG. 1.
Figure 3:
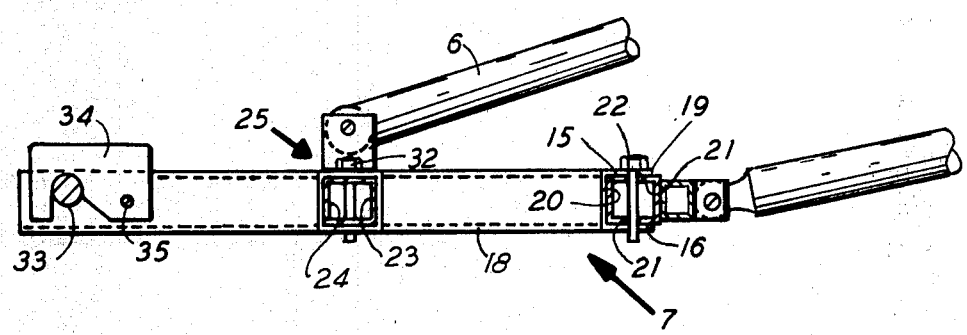
FIG. 3 is a side view in section of the cable laying apparatus taken in the section line 3—3 in FIG. 2.
Figure 4:
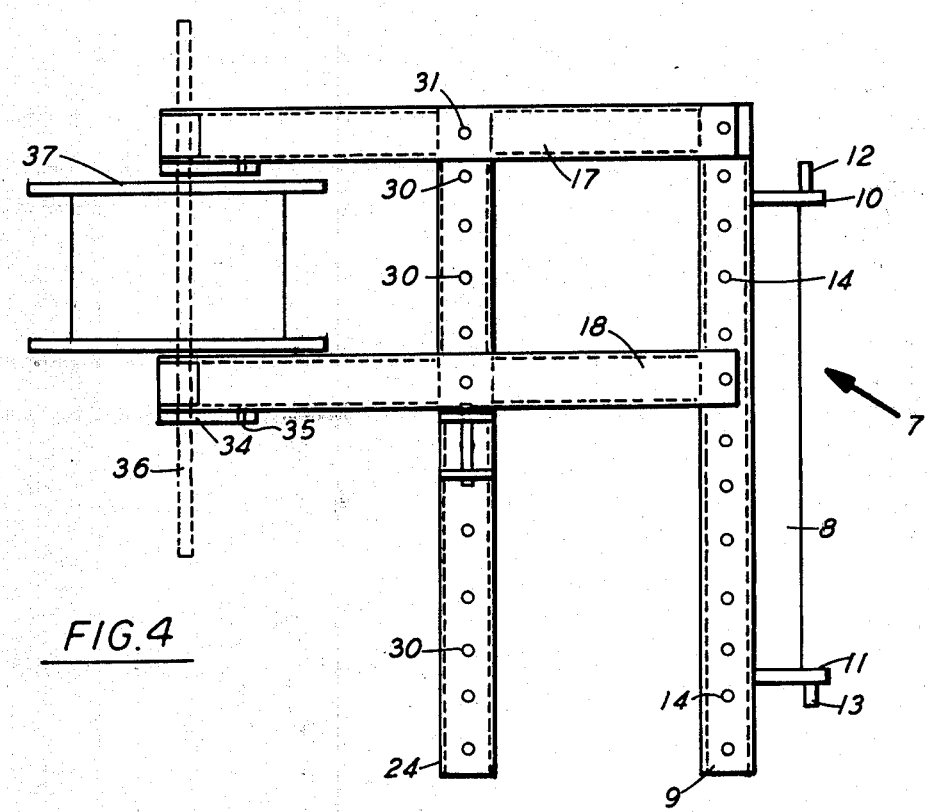
FIG. 4 is a plan view of the apparatus shown in FIG. 2 with the cable spool supporting arms positioned to the side for laying fences.

In FIGS. 2 to 4 of the drawings, there are shown various views of a cable-supporting frame or apparatus 7 for lifting, carrying and unwinding heavy spools 37 of cable or wire. The frame or apparatus 7 is particularly useful for laying electrical wire and cable and also for handling barbed wire for laying fences and the like.

The frame or apparatus 7 is preferably formed as a rectangular framework of square or rectangular cross section hollow steel tubing. In FIG. 2, the frame 7 has a rear supporting member 8 which is secured on a longer piece or supporting member 9, both pieces extending crosswise of the frame and being of hollow steel tubing of square or rectangular cross section. Side plates 10 and 11 are secured to the back surface of tubing 9 and to the ends of tubing 8, as by welding or the like. The side plates 10 and 11 have outwardly extending pins or rods 12 and 13 secured thereon for supporting frame 7 on arms 4 and 5 of three-point hitch 2.

Figure 5:
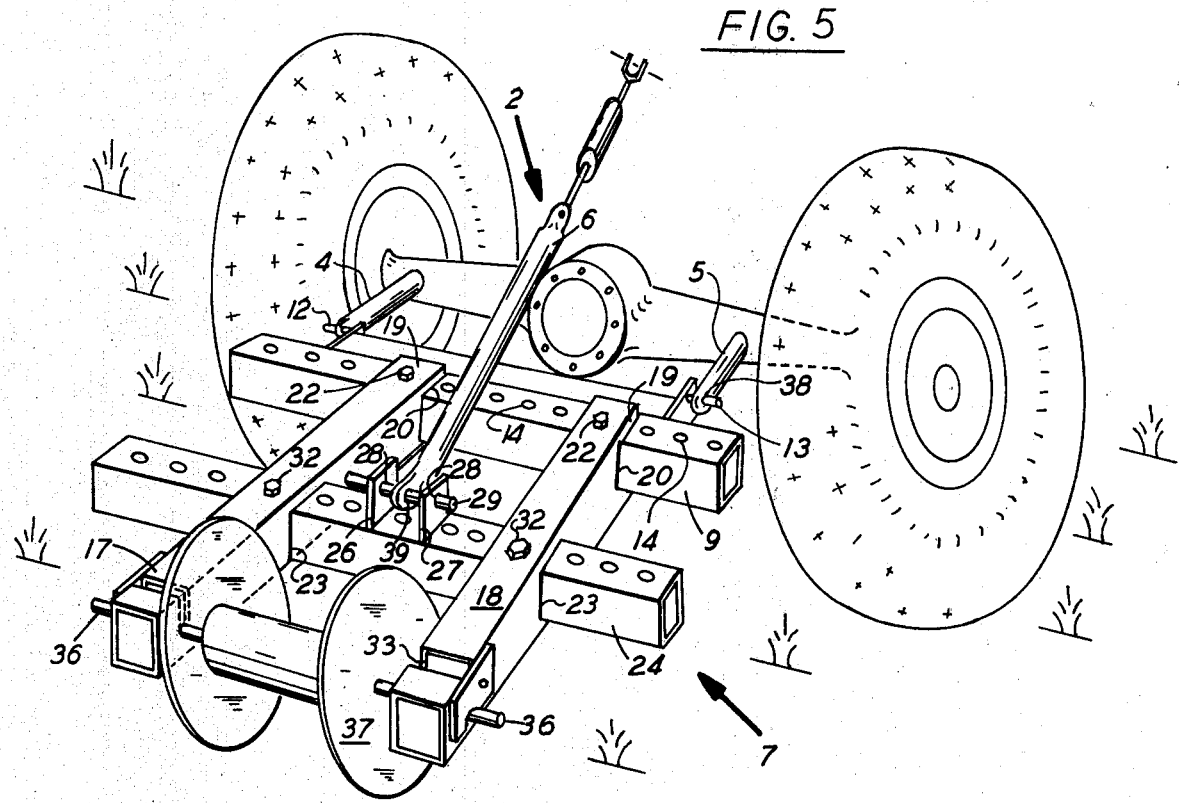
FIG. 5 is an isometric view of the rear end of a tractor with the apparatus of FIG. 2 installed in position.
Figure 6:
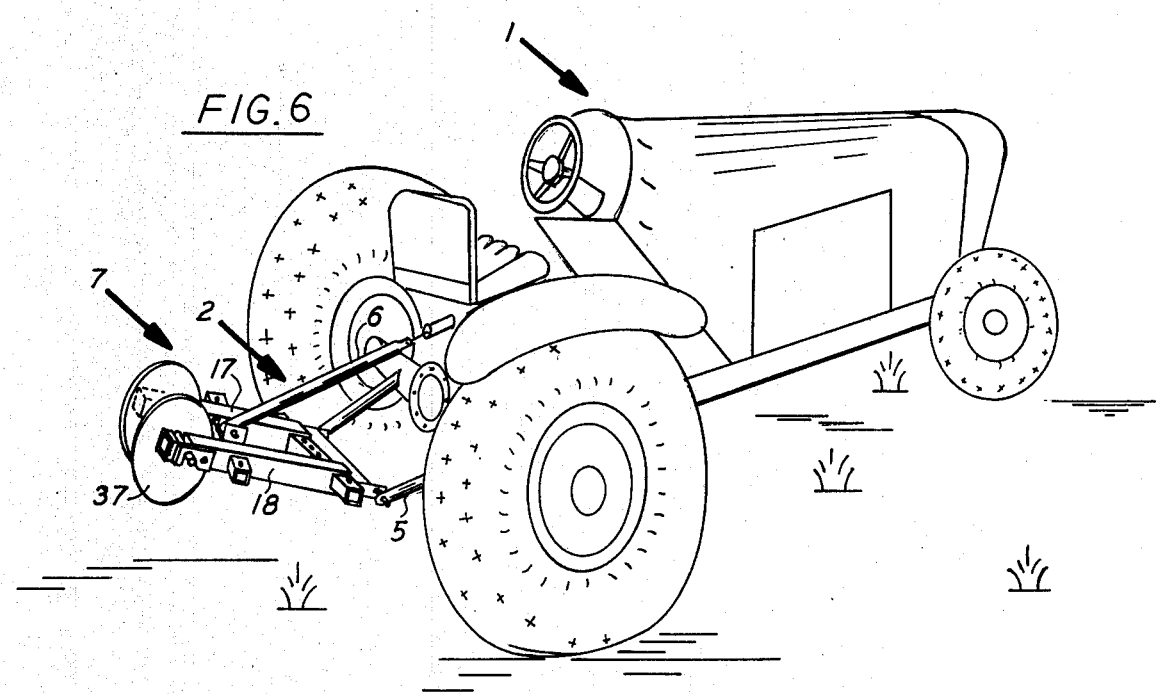
FIG. 6 is an isometric rear view of the tractor and cable laying apparatus in a lifted position.

The square tubing 9 is provided with a series of holes 14 extending vertically through the top and bottom walls 15 and 16 thereof. A pair of rectangular, tubular steel supporting members 17 and 18 have their end portions 19 cut out as indicated at 20 to provide a bifurcated yoke of a size fitting snugly over square tubular supporting member 9. The yoke portion 19 is provided with upper and lower holes 21 which align with holes 14 in tubular supporting member 9 to receive a retaining pin or bolt 22. Tubular supporting members 17 and 18 may be positioned at any point along the crosswise supporting, member 9 at the point permitted by apertures or holes 14 and secured in place by retaining pins or bolts 22. The tubular supporting members 17 and 18 may be spaced desired distance apart and may be spaced more or less symetrically, as seen in FIGS. 2, 5 and 6, or may be positioned to the side, as seen in FIG. 4, for laying fence wire.

At a point about midway of the length of tubular supporting members 17 and 18, there are provided square holes or apertures 23 in the side walls thereof. Square holes or apertures 23 are of a size receiving a supporting member 24, comprising a piece of square tubular steel, snugly therein. Square tubular supporting member 24 extends crosswise of the apparatus and is supported in parallel relation to the rear tubular supporting member 9. Tubular supporting member 24 is provided with a yoke 25 consisting of two plates 26 and 27 with holes 28 through which there extends a pin 29 for securing the yoke to the upper arm 6 of three-point hitch 2.

Tubular supporting member 24 is provided with a plurality of holes or apertures 30 extending vertically there through in spaced relation along the length of the member. The holes 30 are at the same spacing as the holes 14 in tubular supporting member 9. Each of the rearwardly extending tubular supporting members 17 and 18 is provided with vertically extending holes 31 which may be aligned with holes 30 to receive retaining pins or bolts 32.

At the outer end of tubular supporting members 17 and 18, there are provided notches 33 and retaining latches 34 pivoted as at 35. Notches 33 are operable to receive the supporting rod or shaft or axle 36 extending through a spool of cable 37.

OPERATION

The assembly and operation of this apparatus should be apparent from the foregoing description but will be described in further detail for clarification. It should be noted that this apparatus is very simply constructed and, by removing pins 22 and 32, tubular supporting members 9, 24, 17 and 18 may be knocked down and disassembled.

The apparatus may be assembled, as shown, by placing the yokes 19 over tubular supporting member 9 and securing supporting members 17 and 18 in any selected relation thereon. Tubular supporting member 24 is positioned through square holes 23 and retained in place by pins 32. The pins 12 and 13 are supported in holes 38 in the ends of the two lower members 4 and 5 of three-point hitch 2. The upper member 6 of three-point hitch 2 is likewise connected by pin 29 extending through holes 28 and through hole 39 in the end of hitch member 6.

When the apparatus is assembled, as just described, and carried in the lowered position, as seen in FIGS. 1, 3 and 5, it may be moved under supporting rod or shaft or axle 36 for cable spool 37. The shaft or axle or rod 36 is secured against movement by latch members 34. In the position just described, the operation of three-point hitch 2 is effective to lift the cable spool 37, as shown in FIG. 6, for movement by tractor 1. Tractor 1 can be moved along the surface unwinding or playing out the cable as may be required.

The apparatus can be assembled with members 17 and 18 at any selected distance apart up to the limits of the outermost holes 14 and 30. In the laying of fence, particularly barbed wire fence, it is necessary to carry the spool 37 at one side of tractor 1 so that the wire fence can be unwound adjacent to the fence posts. This is accomplished by positioning arms 17 and 18 to one side of the apparatus, as shown in FIG. 4.

The apparatus as shown and described above, is easy to assemble and disassemble and is inexpensive to manufacture. The apparatus is easily operated and may carry spools of wire or cable of different sizes and may position the same either centrally or to one side of the apparatus as may be needed. The apparatus is easily assembled onto a standard three-point hitch on an agricultural type tractor and does not require any modification of the existing hitch or control equipment on the tractor.

While this apparatus has been described fully and completely with special emphasis upon a single preferred embodiment it should be understood that within the scope of the appended claims the invention may be practiced otherwise than as specifically described herein.

I claim:

1. Cable laying apparatus comprising the combination with an agricultural tractor having a rear three-point hydraulically operated hitch with two laterally spaced jointly movable arms and a single separately movable arm operated by hydraulic motor means driven by the tractor engine, of a cable supporting frame comprising a plurality of supporting members of hollow steel tubing arranged in a rectangular frame, one of said supporting members extending crosswise at the rear of said tractor and including means removably connected to said two jointly movable arms of said three-point hitch, two of said supporting members being adjustably supported on said cross-wise member in spaced relation at selected points thereon and extending rearwardly therefrom, each of said rearwardly extending members having a notch in the upper surface at the rear end thereof for supporting the shaft or axle of a spool of wire to be carried thereon, and a second supporting member extending cross-wise of said rearwardly extending members at points intermediate the ends thereof and adjustably secured thereto in parallel relation to said first named cross-wise member and including means connecting the same to said single movable hitch arm.

2. Cable laying apparatus according to claim 1 in which
each of said rearwardly extending supporting members includes a latch member movable secured thereon and cooperable with the notch thereon for securing the shaft or axle of a cable spool in place.

3. Cable laying apparatus according to claim 1 in which
said supporting members are adjustably secured together for assembly or disassembly at the place of use.

4. Cable laying apparatus according to claim 1 in which
said rearwardly extending tubular supporting members are larger in size than the cross-wise supporting members and have aligned holes through which said second cross-wise supporting member extends and is secured.

5. Cable laying apparatus according to claim 1 in which
said rearwardly extending tubular supporting members are larger in size than the cross-wise supporting members,
said rearwardly extending members each having cross-wise aligned holes through which said second cross-wise supporting member extends and is secured, and
said rearwardly extending members each having ends cut out to form yokes fitting over said first named cross-wise member and secured thereto.

6. Cable laying apparatus according to claim 5 in which
each of said cross-wise supporting members has a plurality of holes extending vertically therethrough and spaced at the same selected intervals along the respective lengths thereof,
each of said rearwardly extending members having vertically extending holes through said yokes and through the top and bottom walls thereof at said cross-wise aligned holes,
said holes in said rearwardly extending members being alignable with selected holes in said first named and said second cross-wise supporting members, and
a plurality of securing pins positioned in said aligned holes in said rearwardly extending and said first named and said second cross-wise supporting members to secure the same adjustably together.

7. Cable laying apparatus according to claim 1, 5, or 6 in which
said first named removable connecting means comprises a pair of laterally spaced bracket members on said first named cross-wise supporting member connecting the same to said two jointly movable hitch arms, and
said second named connecting means comprises a bracket member on said second cross-wise supporting member securing the same to said single movable hitch arm.

8. Cable laying apparatus according to claim 6 in which
said holes in said cross-wise members are substantially equally spaced along the lengths thereof.

9. Cable laying apparatus according to claim 6 in which
said holes in said cross-wise member extend substantially to the ends thereof and thereby permitting said rearwardly extending members to be supported adjacent either end of said cross-wise members for supporting a spool of cable to either side of said tractor for use in laying fence wire.

10. Cable laying apparatus adapted for use in combination with an agricultural tractor having a rear three-point hydraulically operated hitch with two laterally spaced jointly movable arms and a single separately movable arm operated by hydraulic motor means driven by the tractor engine,
said apparatus comprising
a cable supporting frame comprising a plurality of supporting members of hollow steel tubing arranged in a rectangular frame,
one of said supporting members extending crosswise at the rear of said tractor, when assembled, and including means removably connectable to said two jointly movable arms of said three-point hitch,
two of said supporting members being adjustably supported on said cross-wise member in spaced relation at selected points thereon and extending rearwardly therefrom,
each of said rearwardly extending members having a notch in the upper surface at the rear end thereof for supporting the shaft or axle of a spool of wire to be carried thereon, and
a second supporting member extending cross-wise of said rearwardly extending members at points intermediate the ends thereof and adjustably secured thereto in parallel relation to said first named cross-wise member and including means connecting the same to said single movable hitch arm.

11. Cable laying apparatus according to claim 10 in which
each of said rearwardly extending supporting members includes a latch member movable secured thereon and cooperable with the notch thereon for securing the shaft or axle of a cable spool in place.

12. Cable laying apparatus according to claim 10 in which
said supporting members are adjustably secured together for assembly or disassembly at the place of use.

13. Cable laying apparatus according to claim 10 in which
said rearwardly extending tubular supporting members are larger in size than the cross-wise supporting members and have aligned holes through which said second cross-wise supporting member extends and is secured.

14. Cable laying apparatus according to claim 10 in which
said rearwardly extending tubular supporting members are larger in size than the cross-wise supporting members,
said rearwardly extending members each having cross-wise aligned holes through which said second cross-wise supporting member extends and is secured, and
said rearwardly extending members each having ends cut out to form yokes fitting over said first named cross-wise member and secured thereto.

15. Cable laying apparatus according to claim 14 in which
each of said cross-wise supporting members has a plurality of holes extending vertically therethrough and spaced at the same selected intervals along the respective lengths thereof,
each of said rearwardly extending members having vertically extending holes through said yokes and through the top and bottom walls thereof at said cross-wise aligned holes, said holes in said rearwardly extending members being alignable with selected holes in said first named and said second cross-wise supporting members, and a plurality of securing pins positioned in said aligned holes in said rearwardly extending and said first named and said second cross-wise supporting members to secure the same adjustably together.

16. Cable laying apparatus according to claim 10, 14, or 15 in which said first named removable connecting means comprises a pair of laterally spaced bracket members on said first named cross-wise supporting member for connecting the same to said two jointly movable hitch arms, and said second named connecting means comprises a bracket member on said second cross-wise supporting member for securing the same to said single movable hitch arm.

17. Cable laying apparatus according to claim 15 in which said holes in said cross-wise members are substantially equally spaced along the lengths thereof.

18. Cable laying apparatus according to claim 15 in which said holes in said cross-wise member extend substantially to the ends thereof and thereby permitting said rearwardly extending members to be supported adjacent either end of said cross-wise members for supporting a spool of cable to either side of said tractor, when assembled, for use in laying fence wire.

* * * * *